(12) United States Patent
Guttromson et al.

(10) Patent No.: US 6,707,179 B2
(45) Date of Patent: Mar. 16, 2004

(54) PROTECTED SEAL AND RELATED METHODS FOR SEALING FLUID IN POWER GENERATION SYSTEM

(75) Inventors: Ross Guttromson, Richland, WA (US); Daniel J. Ryan, Oviedo, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 87 days.

(21) Appl. No.: 09/910,221

(22) Filed: Jul. 20, 2001

(65) Prior Publication Data

US 2003/0015924 A1 Jan. 23, 2003

(51) Int. Cl.[7] .................................................. H02K 9/00
(52) U.S. Cl. .............................. 310/52; 310/71; 310/55
(58) Field of Search ............................ 310/52, 54, 55, 310/57, 64, 71

(56) References Cited

U.S. PATENT DOCUMENTS

| | | | |
|---|---|---|---|
| 2,950,403 A | 8/1960 | Kilner et al. | 310/232 |
| 3,564,315 A | 2/1971 | Barton et al. | 310/227 |
| 3,983,615 A | 10/1976 | Morishita | 29/182.5 |
| 4,076,262 A | 2/1978 | Deventer | 277/227 |
| 4,682,064 A | 7/1987 | Crounse et al. | 310/61 |
| 4,714,257 A | 12/1987 | Heinrich et al. | 277/1 |
| 5,602,435 A | 2/1997 | Iseli et al. | 310/55 |
| 5,767,602 A | 6/1998 | Sargeant | 310/258 |
| 5,777,406 A | 7/1998 | Bomba et al. | 310/61 |
| 5,785,114 A | 7/1998 | Armstrong et al. | 165/47 |
| 5,866,960 A | 2/1999 | Meier et al. | 310/59 |
| 5,883,448 A | 3/1999 | Zimmerman | 310/58 |
| 6,104,111 A | 8/2000 | Pullen et al. | 310/59 |
| 6,121,708 A | 9/2000 | Muller | 310/214 |
| 6,130,493 A | 10/2000 | Nitschke et al. | 310/59 |

Primary Examiner—Dang Le

(57) ABSTRACT

An apparatus having a slidable seal and related methods to prevent leakage of hydrogen gas or other fluids in a power generator is provided. The seal can connect to a high-current conductor when slidably contacting the surface of a fluid channel formed around the conductor. The seal slidably moves relative to and maintains contact with the surface of the fluid channel. The seal preferably includes a seal body having an abrasion abatement layer of soft metal to prevent abrasions of the seal surface as it slidably moves relative to the fluid channel. The seal can include at least one sealing gasket positioned to fit within a sealing gland formed in the fluid channel. Alternatively, the seal can have at least one sealing gasket positioned in a sealing gasket formed in the seal body and an insulating gasket positioned to restrict the flow of seal-degrading electrical currents in the seal.

8 Claims, 9 Drawing Sheets

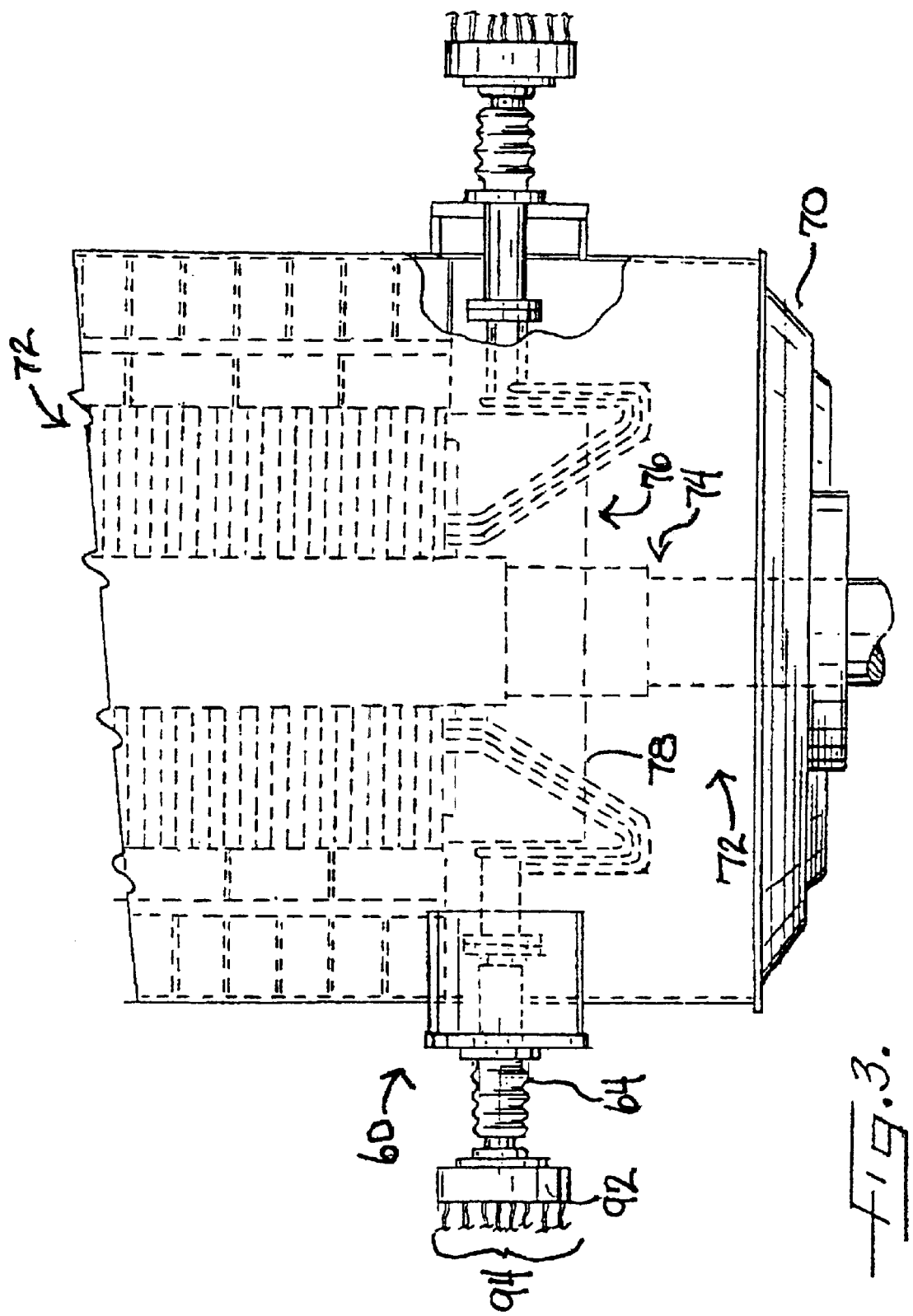

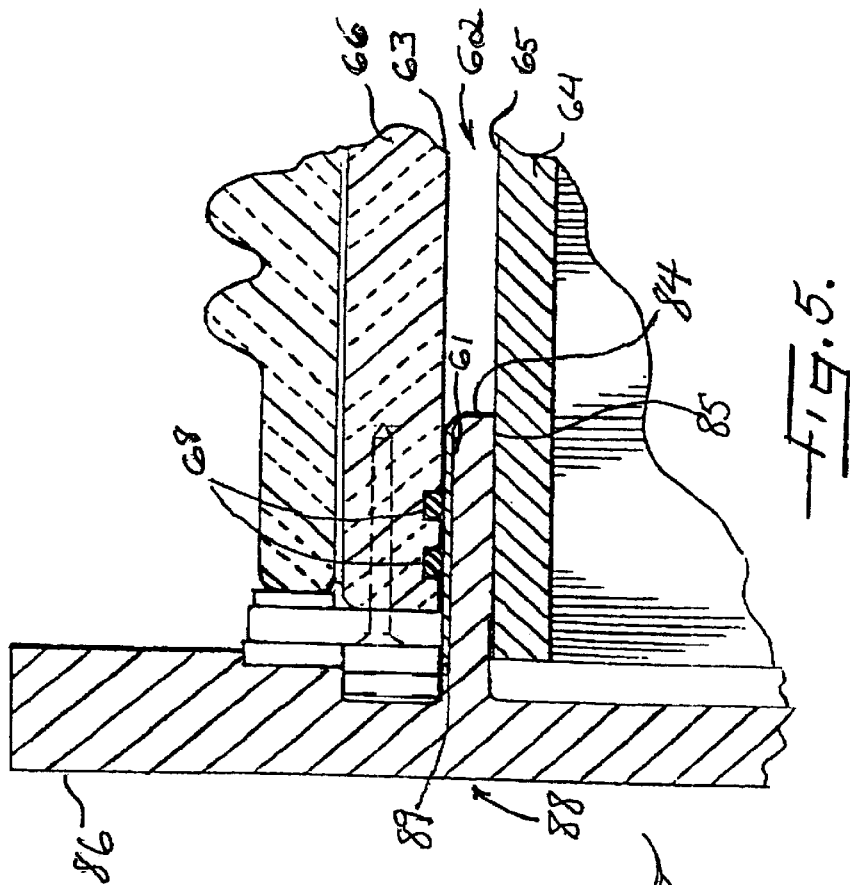
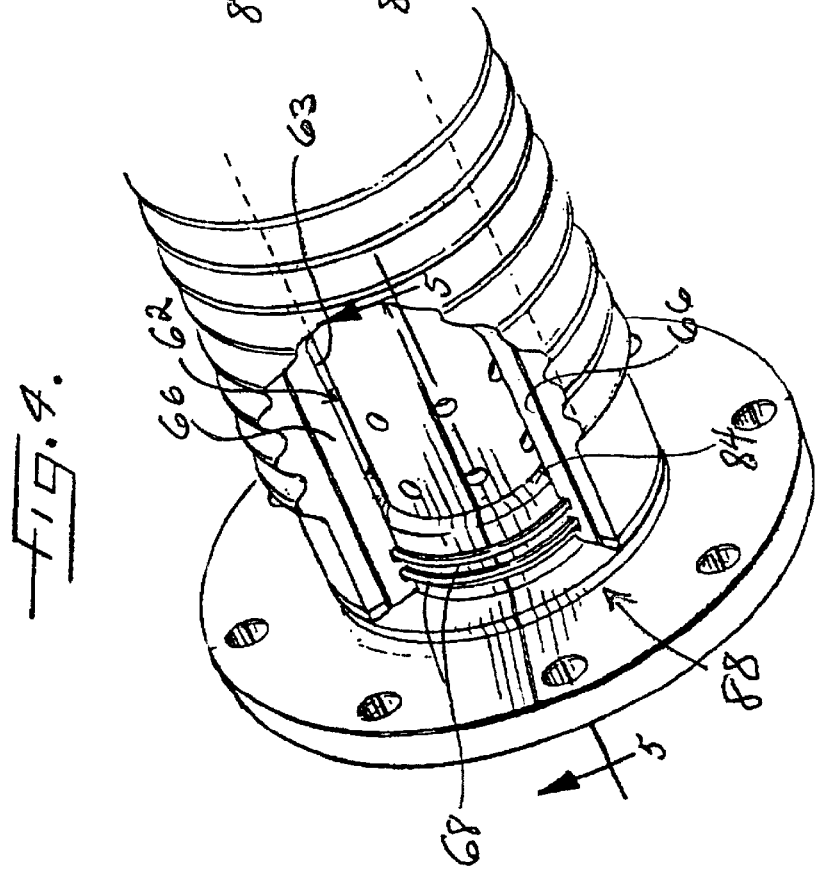

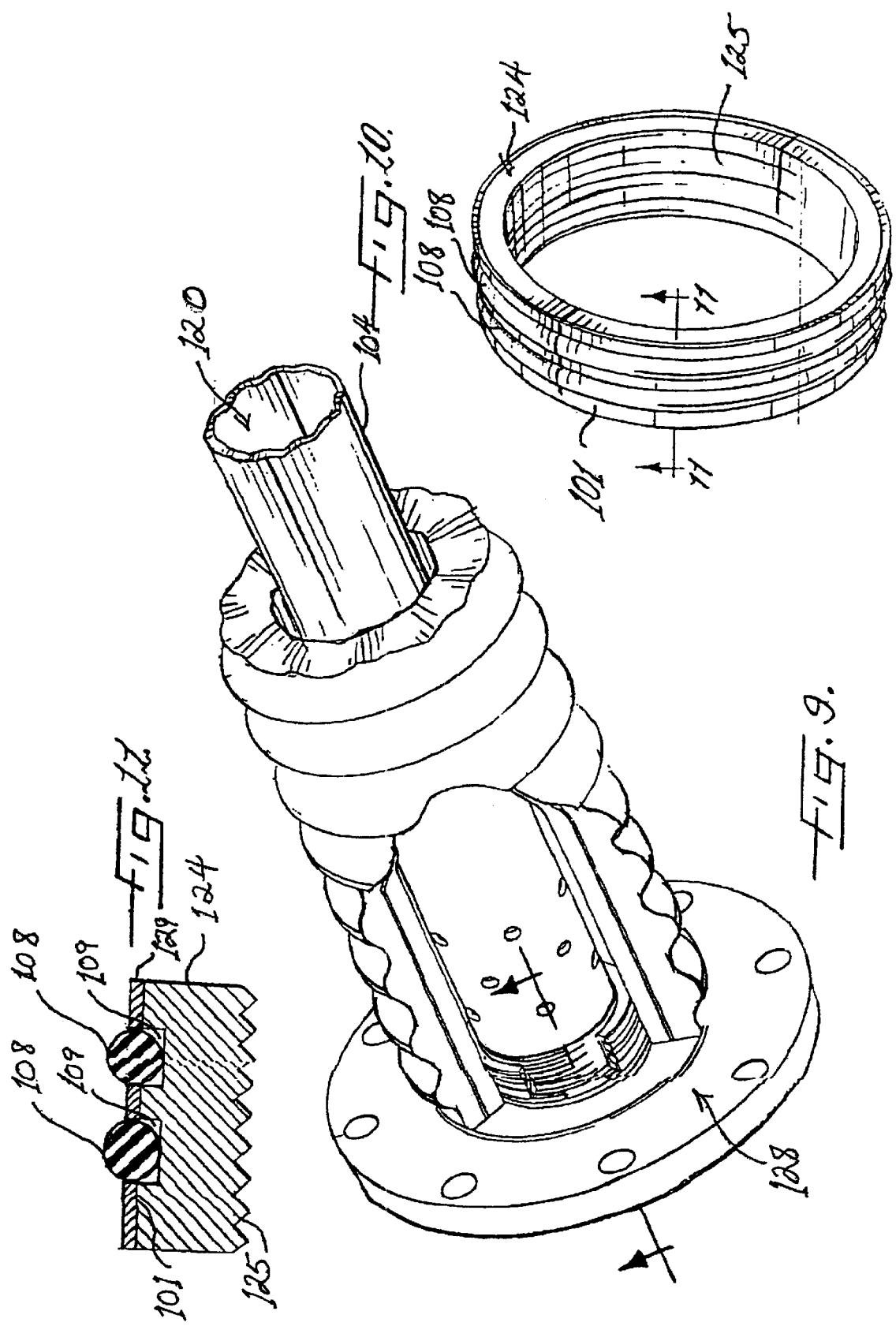

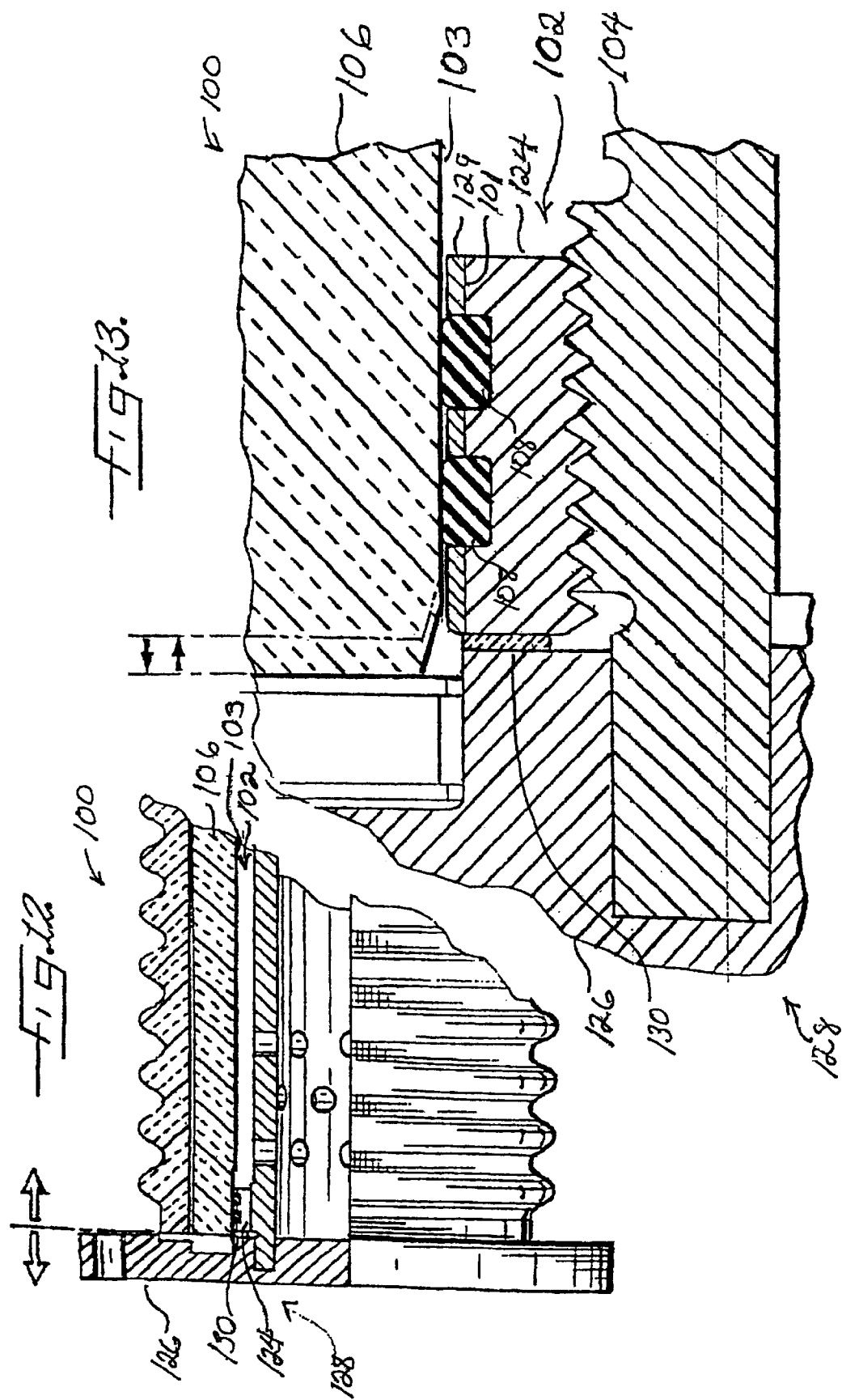

PROTECTED SEAL AND RELATED METHODS FOR SEALING FLUID IN POWER GENERATION SYSTEM

FIELD OF THE INVENTION

This invention is related to seals for preventing fluid leakage and, more particularly, to seals used in power generators.

BACKGROUND OF THE INVENTION

Within the power generation industry, large-scale power generators convert mechanical energy, typically the energy output of a turbine, into electrical energy. The basic components of such power generators are a frame-supported stator core that provides a high permeability path for magnetism and a rotor assembly positioned to rotate continuously within the stator core so as to induce electrical current through rotor-borne conductors moving through magnetic fields set up within the stator. The resulting current is carried by high-current conductors through and out from a housing surrounding the power generator, to flex connectors that provide the current to a plant bus for power distribution to consumers, commercial establishments, and other users of electrical power.

According to the well-understood physics of electrical conduction through a conductor, current arises as a result of the flow of "free" electrons that move under the influence of an electric field through the conductor. In free space the electrons accelerate and continually increase their velocity (and energy), but within the crystalline material of a conductor the electrons are impeded by their continual collisions with thermally excited atoms arranged in a crystalline lattice structure in the conductor until a constant average "drift" velocity is attained. As a result of these collisions, heat is generated raising the temperature of the conductor and the surrounding environment. This effect can be especially pronounced within large scale power systems where large currents are generated and carried by the high-current conductors described above.

To deal with these temperature effects, various cooling systems are employed within large-scale power generators. For example, channels within the frame housing, the stator core and rotor assembly channel can be added to the power generator system to provide an avenue for a cooling fluid to flow into and out of the housing to cool the components therein. Frequently, hydrogen gas ($H_2$) is used as a cooling fluid. These cooling devices, however, pose collateral challenges. In order to be effective in cooling the components of the power generator, the cooling fluid (i.e., hydrogen gas or other fluid) must be appropriately channeled or otherwise directed to the components. When flowing in such a channel, the cooling fluid must be maintained therein lest it escape into the air surrounding the frame thereby losing its cooling effect while inadvertently contaminating the surrounding environment.

In order to circulate the cooling fluid throughout the power generator, large blowers are usually employed to provide pressure differentials that disperse the cooling fluid within the frame housing the stator core and rotor assembly. The pressure so created can be quite high. Thus, to maintain the cooling fluid within the appropriate channel within the frame housing the stator core and rotor assembly, the channel must be sealed. The seal relied on to seal a channel must be able to withstand considerable pressure. In the typical power generation context, a sealing device intended to maintain the cooling fluid within the fluid channel must effectively accommodate pressures of as much as 75 pounds per square inch gauge (PSIG).

Of particular importance are the seals employed where the high-current conductors extend through the housing. For cooling purposes, the high-current conductor usually has a hollow channel or bore extending axially within the conductor and through which a cooling fluid such as hydrogen gas ($H_2$) is pumped. The cooling fluid flows under pressure through the bore and exits the bore through vent holes formed through the conductor, flowing into a fluid channel extending along the conductor. Alternatively, a second bore can be disposed inside the channel or bore of the high-current conductor. Cooling fluid is then pumped into the inner bore where it flows out through vent holes and circulates within the channel formed by the high-current conductor.

Various sealing mechanisms have been used with varying degrees of success in attempting to effectively and efficiently seal cooling fluid within designated fluid channels in a power generator. U.S. Pat. No. 2,950,403 by Kilner et al., titled *Electrical Turbo Generators,* for example, describes the use of gas-tight shroud rings to contain gas surrounding the connection between a collector lead and collector ring. U.S. Pat. No. 4,682,064 by Crounse et al. titled *Coolant Gas Flow Separator Baffle For A Dynamoelectric Machine* describes a flexible flange that is urged into tighter abutment with the stator as surrounding gas pressure increases. U.S. Pat. No. 5,866,960 by Meier et al., titled *Gas-Cooled Electrical Machine* describes sealing cooling channels using a sealing cap and screw connection through which a tube extends. Finally, in the context of a non-cooling use, U.S. Pat. No. 6,121,708 by Muller titled Slot Sealing Arrangement describes sealing the winding slot in a stator core from an air gap using convex-surfaced wedges.

In other contexts, though, use of a sliding seal has been proposed. For example, U.S. Pat. No. 4,076,262 by Deventer titled Sliding Seal describes generally a seal comprising a rigid base (e.g., a metal or hard resin) that connects to an object and a flexible protrusion from the base that pliably bends with a foreign object as the foreign object contacts the outer portion of the protrusion in a moving fashion (See U.S. Pat. No. 4,076,262 FIGS. 2 and 6). Thus, as illustrated therein, the seal does not so much slide relative to the foreign object as much as it bends therewith. U.S. Pat. No. 4,714,257 by Heinrich et al. titled Annular Sliding Body For A Sliding Seal And Process For Use Thereof describes a dual-piece device having a sliding ring and counter ring, wherein the former remains stationary while the later rotates annularly by sliding against the former.

These and other conventional seals, both in the context of power generation and in other situations, generally do not permit the seal to slide or otherwise move in response to thermal expansion, fluid pressure, or vibratory movements that occur during operation of the power generator. Conventional seal designs, at best, allow for thermal expansion on the high-pressure side of the seal during thermal cycling of the power generator. This is the case with the wedge-ring seal conventionally employed for sealing cooling fluid in a fluid channel surrounding a high-current conductor in a power generator. FIGS. 1 and 2 illustrate a conventional wedge-ring seal 20 used to seal hydrogen gas or other cooling fluid within a fluid channel 22 surrounding a high-current conductor 24 of a power generator.

The conventional wedge-ring seal 20 poses several distinct problems. Among these is the inability of the wedge-ring seal 20 to smoothly slide relative to a sleeve 26 or other fluid channel forming member, thereby resulting in abrading degradation of a surface 21 of the wedge-ring seal 20 when the wedge-ring seal 20 movingly contact a surface 27 of the fluid channel forming member. The wedge-ring seal 20 is typically formed of a conductive material such as copper and is brazed to the high-current conductor 24. The wedge-ring seal 20 is usually "wedged" against the channel-forming sleeve 26, which is normally formed of fiberglass. The fiberglass sleeve 26 typically exhibits an abrading property, usually resulting from the machining of the fiberglass to form the dimensions of the sleeve 26 to accommodate the wedge-ring seal 20. Machining removes any resin layer that would otherwise provide smooth contact between the fiberglass surface 27 of the sleeve 26 and the surface 21 of the wedge-ring seal 20.

Instead of a smooth, resined layer on the surface 27 of the fiberglass sleeve 26, the surface 27 has minute shards of glass particles extending therefrom, thereby creating an abrasive layer. Thermal expansion, vibratory motion, and/or fluid pressure can force the wedge-ring seal 20 to move relative to the sleeve 26 against which the wedge-ring seal is wedged. When the wedge-ring seal 20 moves relative to the sleeve 26, the minute shards of glass embedded in the fiberglass surface 27 abrade the surface 21 of the wedge-ring seal 20 thereby causing the wedge-ring seal 20 to degrade.

Another distinct problem posed by the wedge-ring seal 20 is that the wedge-ring seal 20 must be fixedly connected to the high-current conductor 24 substantially spaced apart from the end portion of the high-current conductor 24. FIG. 1 illustrates the nature of the problem. As shown, the end portion of conductor 24 must be adapted to mechanically connect to a flange 28 (the "air-side flange") so as to electrically connect the conductor 24 to a bus assembly for transferring current from the generator. An adaptive portion 30 provides mechanical support to secure the conductor 24 and the flange 28. The wedge-ring seal 20, of necessity, then, is spaced apart from the end-positioned connection. With the wedge-ring seal spaced apart from the end portion of the conductor 24, a significant portion of the surface area of the conductor 24 is precluded from receiving vent holes.

The absence of vent holes along the surface area occupied by the wedge-ring seal prevents cooling fluid from reaching the entire extend of the conductor 24. Although, alternatively, cooling fluid can be supplied at the end of the high-current conductor by supplying the fluid through a fluid channel contained within the bore of the high-current conductor itself, as described above, the fluid remains within the high-current conductor bore thereby preventing the fluid's reaching the outer surface of the high-current conductor. Therefore, given the obstacles posed by the conventional wedge-ring seal 20, cooling is constrained to reach only part of the inner and outer surfaces of the high-current conductor, or extend over the entire length of the high-current conductor but reach only the inner surface thereof.

An additional, heretofore substantially unrecognized problem with a conventional wedge-ring seal 20 concerns the O-ring 28 that as perhaps best shown in FIG. 2 is positioned within an O-ring gland 29 formed in the surface 21 of the wedge-ring seal 20 to prevent leakage of hydrogen gas or other cooling fluid from the fluid channel 22. Because the wedge-ring seal 20 is formed of a conductive material and is normally not insulated, electrical current flows along the entire surface of the wedge-ring seal 20 thereby flowing along the surface of the O-ring gland 29 as well. The current causes electrical loses and O-ring degradation due to corresponding temperature increases.

SUMMARY OF THE INVENTION

In view of the foregoing, the present invention advantageously provides an apparatus for sealing fluids under fluid pressure within a fluid channel. The apparatus specifically includes a seal that is connected to a conductor while being able to move, slidably and otherwise, relative to a surface portion of a fluid channel forming member positioned adjacent the conductor. Thus, the seal, according to the present invention, advantageously permits the seal to smoothly slide or otherwise move relative to a fluid channel in a power generator in response to thermal expansion during thermal cycling, changes in fluid pressure in the fluid channel, and vibratory motions that inevitably occur during operation of a power generator and cause the seal to move against the surface of the fluid channel.

The seal, moreover, is protected in several distinct ways. Firstly, the seal is insulated so as to inhibit electrical loses through the seal. The seal also is insulated so as to prevent the through-flow of current in and around portions of the conductor that are easily degraded by high temperatures and other current-related effects. Additionally, to protect the seal when the seal slidably or otherwise contacts the surface of the fluid channel, the surface of the seal is formed so as to be substantially immune from seal-degrading abrasions Thus, the seal substantially reduces or eliminates current flow that would otherwise cause electrical losses and generate temperature increases that can degrade the seal while being substantially immune from abrasions as the seal slidably or otherwise moves in contact with the fluid channel.

The apparatus thus provides particular advantages in the context of the power generation industry where the apparatus can be used effectively and efficiently to prevent leakage of fluid (e.g., hydrogen gas) in a large-sized, fluid-cooled power generator. The apparatus, among its various uses, specifically prevents leakage of hydrogen ($H_2$) gas in a hydrogen-cooled power generator, the power generator including a stator having a stator core which provides a high-permeability path for magnetism and a high-current conductor extending from the stator to connect to a main lead positioned apart from the stator. The apparatus also preferably includes a sleeve positioned substantially around the high-current conductor and spaced apart therefrom so as to form a fluid channel bounded on a side by a portion of an outer surface of the high-current conductor and on another side by a portion of the inner surface of the sleeve to thereby define a fluid channel.

In order to seal the hydrogen gas within the fluid channel, a protected seal is positioned within the fluid channel between the high-current conductor and the sleeve to form an end boundary of the fluid channel. The seal preferably includes a seal body having a first surface portion that fixedly contacts an outer surface portion of the high-current conductor and a second surface portion that slidably contacts an inner surface portion of the sleeve so as to prevent leakage of hydrogen ($H_2$) gas contained within the fluid channel. The seal is positioned to permit the second surface portion of the seal body to slidably move relative to the sleeve or otherwise movingly contact the sleeve in response to thermal expansion, fluid pressure, and vibratory motion.

Within the fluid channel, the seal divides the space immediately adjacent the high-current conductor into a first distinct region and a second distinct region. The seal, so positioned, then is able to prevent fluid flow between the distinct first and second regions while permitting sliding and other moving contact of the seal with an inner surface portion of the sleeve. In one embodiment, the seal specifically includes a seal body having an annular shape and being positioned to substantially surround portions of the high-current conductor while a surface portion of the seal slidably moves relative to the sleeve. A substantially centered opening extends through the annularly shaped seal body and is threaded so as to thread onto a correspondingly threaded portion of the high-current conductor.

Moreover, at least one sealing gasket gland, for example, can be formed in the outer surface of the annularly shaped seal body or, alternatively, is machined into the sleeve in order to position therein a sealing gasket that expands and contracts to maintain a secure seal against a surface portion of a fluid channel to thereby prevent fluid leakage from the channel. Preferably, the sealing gasket is provided by at least one O-ring positioned within at least one O-ring gland that extends along the circumference of the outer surface of the annular seal body. The O-ring abuttingly contacts and moves relative to the inner surface portion of the sleeve to thereby substantially prevent fluid flow from the first distinct region to the second distinct region adjacent to the high-current conductor.

The sliding seal further includes an abrasion abatement layer disposed on a surface portion of the seal body to prevent degradation of the seal as the seal slidably or otherwise moves relative to and comes in contact with a surface portion of the fluid channel. Preferably, the abrasion abatement layer is formed of a metallic material such as silver plating formed on a copper seal body. The abrasion abatement layer provides a "soft" metallic layer that interacts with the surface of the fluid channel to dispose within the interstices of any abrading particles extending from the fluid channel, thereby smoothing the fluid channel surface rather than being abraded by the surface. The seal body itself is advantageously formed from a material having the same thermal expansion coefficient as the conductor to which it connects.

The present invention also provides alternative means for insulating the seal body and sealing gasket from current through-flows into the seal body so as to minimize electrical losses and reduce or eliminate current-induced temperature increases in the seal body that would otherwise reduce the operational life and reliability of the sealing gasket. According to one embodiment, the apparatus preferably includes at least one sealing gasket gland positioned within the surface of the fluid channel. The seal is adapted so that at least one sealing gasket can be positioned in the at least one gland. Alternatively, the apparatus includes a separate insulating gasket for inhibiting current flow that would otherwise cause electrical loss and seal-degrading temperature increases in the seal.

Preferably, the seal includes an annular portion defining a seal body that is threaded so as to thread securely onto a correspondingly threaded end portion of a conductor positioned within or adjacent a fluid channel. Particular advantages of the present invention, however, also pertain to various embodiments of a sliding seal formed into shapes other than the hollowed-center annular shape. More generally, the apparatus includes a sliding seal formed to fit within a fluid channel having virtually any dimensions. The seal has both a first surface that fixedly contacts the high-current conductor, and a second surface that slidably contacts a surface portion of a sleeve or other fluid channel forming member that is spaced apart from the high-current conductor and that forms the fluid channel positioned adjacent the high-current conductor.

The second surface of the seal body slidably or otherwise moves relative to and movingly contacts with the fluid channel forming member in response to thermal expansion, vibratory motions, and changes in fluid pressure. The sliding seal, preferably also includes along the second surface a pliable and compressible surface portion that responds to the slidable movement of the seal by expanding or contracting, respectively, so as to prevent gaps between the second surface of the seal body and the surface of the channel forming member as the second surface slidably moves relative thereto. So too, in this general context, the present invention as already noted provides a seal substantially protected from current flow that would degrade the seal, especially the pliable and compressible surface portion, and from seal degrading abrasions as the seal movingly contacts the surface of the fluid channel forming member.

The present invention also provides a method for preventing leakage of a cooling fluid, such as hydrogen ($H_2$) gas, in a fluid-cooled power generator. The method includes maintaining fluid in a fluid channel using a seal having a first surface fixedly connected to the high-current conductor. The method further includes slidably contacting a second surface of the seal to a surface portion of the fluid channel to thereby permit the seal to slidably move relative to the surface portion of the fluid channel, the surface having an abrasion abatement layer to prevent degradation of the seal.

The method so described further includes positioning a layer of sealing material on a high-current conductor, the conductor having a threaded outer surface, and threading the seal over the sealing material positioned on the threaded portion of the high-current conductor to thereby fixedly connect the seal and the threaded portion of the high current conductor to the sealing material positioned therebetween. Also the method can additionally include preventing conduction of current from the high-current conductor through the seal to thereby reduce current-induced degradations to the seal.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 3 is a fragmentary top plan view of a power generation system including a high-current conductor, bus assembly, and a sliding seal to prevent fluid leakage under pressure according to a first embodiment of the present invention;

FIG. 4 is a fragmentary perspective view of an insulation covered high-current conductor, the view having portions broken away to provide a view of a sliding seal positioned within a fluid channel surrounding the conductor according to a first embodiment of the present invention;

FIG. 5 is a sectional view of a conductor, fluid channel and sliding seal taken along line 5—5 of FIG. 4, the seal including a seal body having an abrasion abatement layer and being integrally formed with a seal flange according to a first embodiment of the present invention;

FIG. 9 is a fragmentary perspective view of an insulation covered high-current conductor, the view having portions broken away to provide a view of a sliding seal positioned within a fluid channel surrounding the conductor according to a second embodiment of the present invention;

FIG. 10 is a perspective view of sliding seal body to prevent fluid leakage under pressure according to a second embodiment of the present invention;

FIG. 11 is a sectional view of a sliding seal taken along line 11—11 of FIG. 10, the seal including a seal body having an abrasion abatement layer and two sealing gaskets positioned in sealing gasket glands formed in the seal body according to a second embodiment of the present invention;

FIG. 12 is a fragmentary sectional view of a sliding seal having a seal body, sealing gasket, and sealing gasket gland to prevent fluid leakage under pressure according to a second embodiment of the present invention;

FIG. 13 is sectional view of a sliding seal body, sealing gasket, and sealing gasket gland to prevent fluid leakage under pressure according to a second embodiment of the present invention; and FIG. 14 is an exploded fragmentary perspective view of a fluid channel forming member, fluid channel, and seal positioned in the fluid channel, the view having portions broken away to provide a view of a high-current conductor substantially surrounded by the forming member and fluid channel and the seal having a sea™ body with sealing gaskets positioned within sealing gasket glands formed in the seal body according to a second embodiment of the present invention.

DETAILED DESCRIPTION OF THE PREFERRED EMBODIMENT

Figure 1:
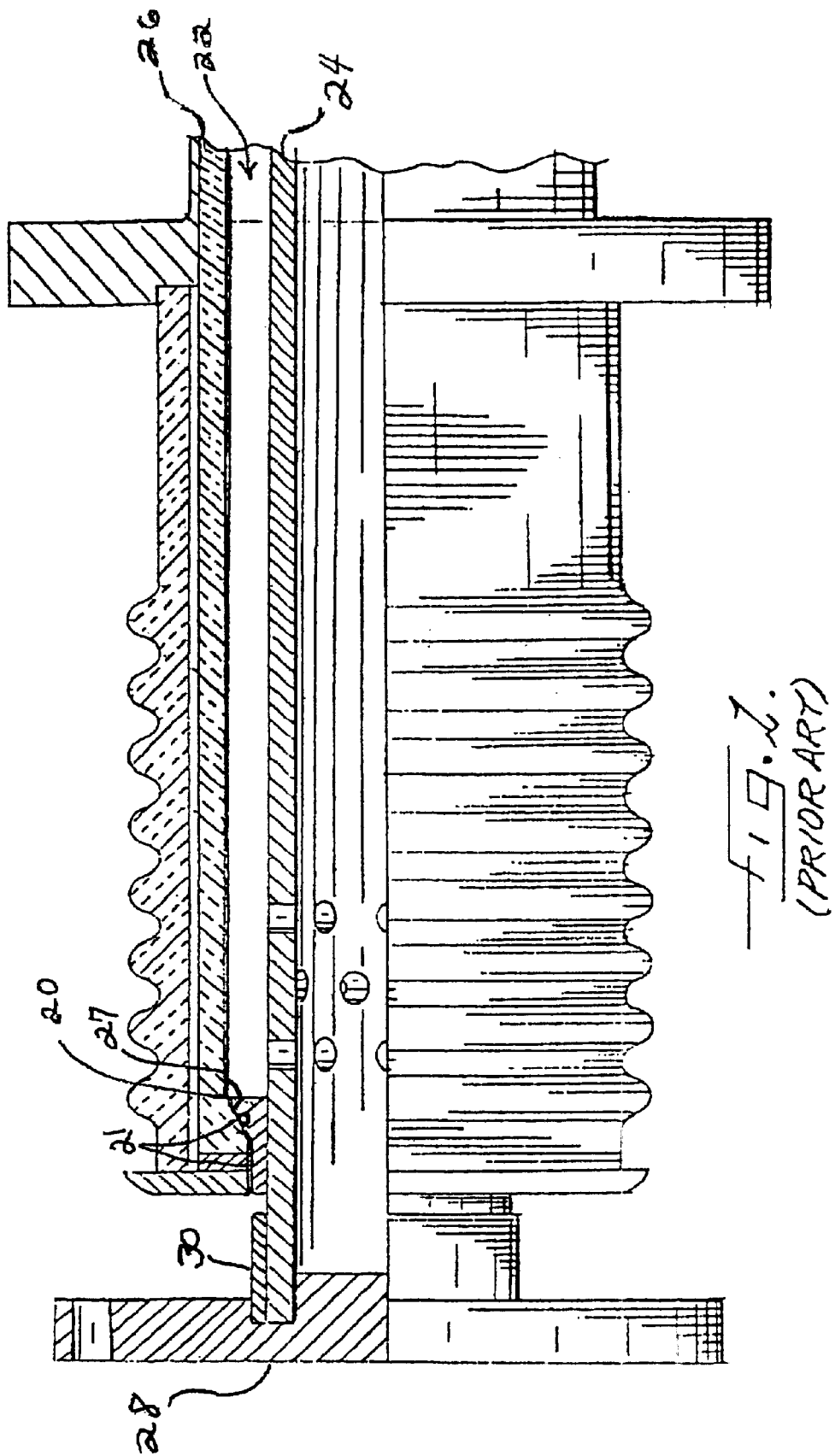
FIG. 1 is a fragmentary perspective view of a fluid channel having portions broken away to provide a sectional view of portions of a conductor, a fluid channel, and a wedge-ring seal to prevent fluid leakage according to the prior art.
Figure 2:
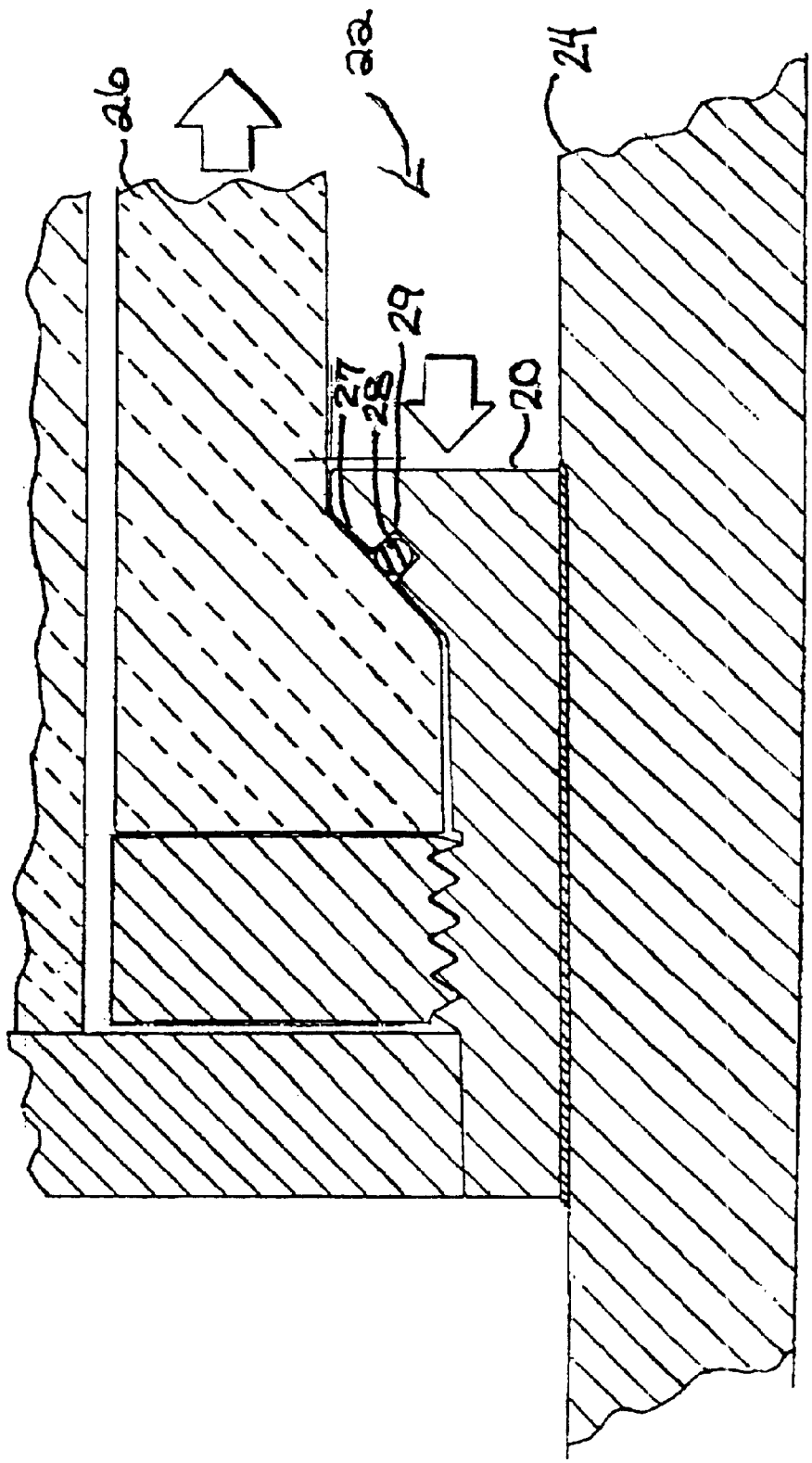
FIG. 2 is a sectional view of a seal formed of a wedge and O-ring according to the prior art.

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art.

FIG. 3 illustrates an apparatus 60 to prevent leakage of fluid in a fluid-cooled power generator according to the present invention. The apparatus 60 preferably includes a housing 70 and a power generator 72 contained within the housing 70. The power generator includes a rotor 74 and a stator 76 having a stator core 78 preferably formed of multiple laminations to provide a high-permeability path for magnetism. In operation, the generator 72 generates electrical power utilizing mechanical energy to turn the rotor within the stator core 78 to thereby generate electrical power through electromagnetic induction as will be readily understood by those skilled in the art. At least one high-current conductor 64 extends from a main lead connected to a set of parallel rings associated with the stator 76 of the power generator 72 to carry current to a bus assembly positioned outside the housing 70 to receive electrical power from the generator 72.

Figure 8:
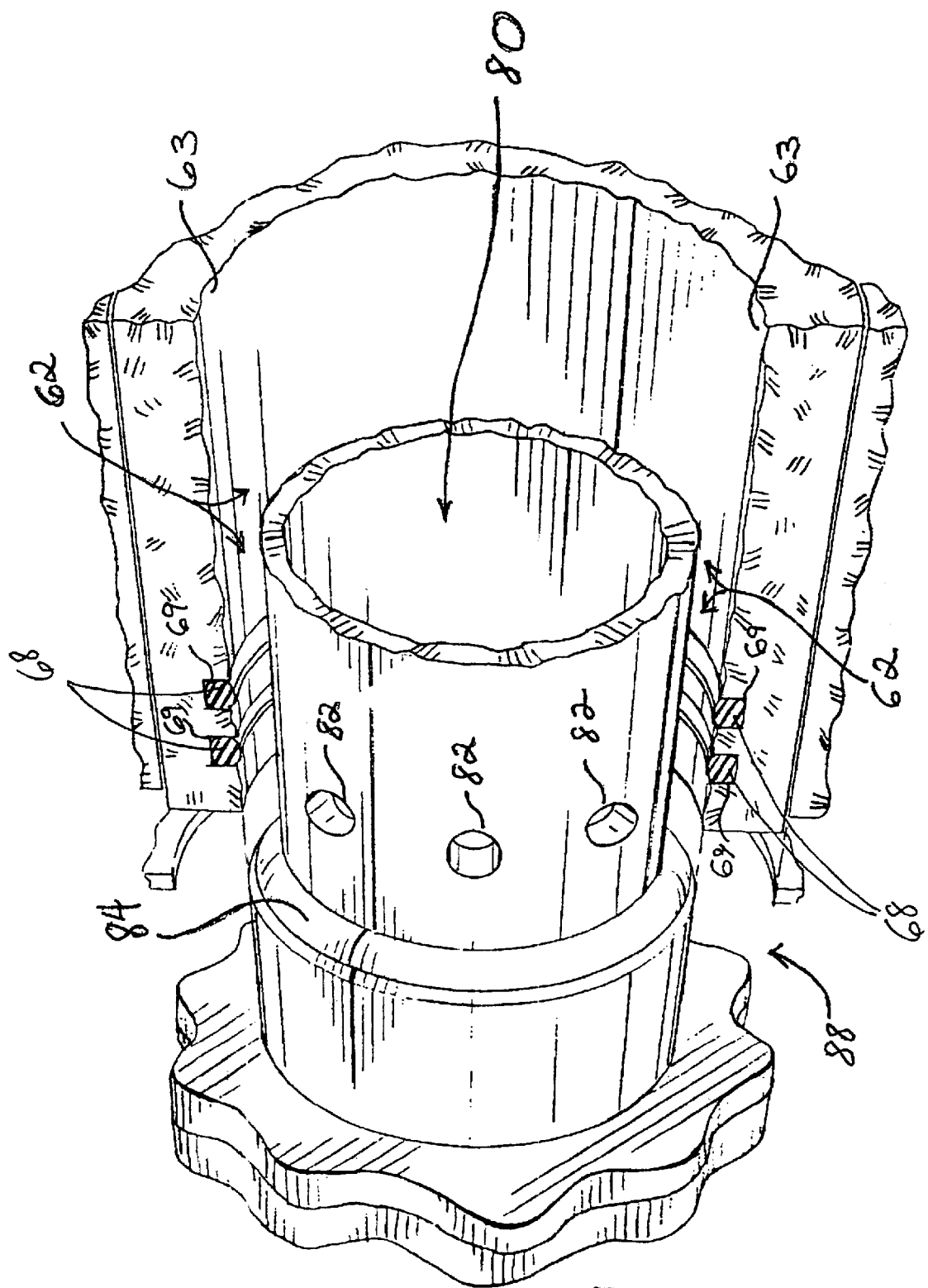
FIG. 8 is an exploded fragmentary perspective view of a fluid channel forming member, fluid channel, and seal positioned in the fluid channel, the view having portions broken away to provide a view of a high-current conductor substantially surrounded by the forming member and fluid channel and the seal having sealing gaskets positioned within sealing gasket glands formed in the fluid channel forming member according to a first embodiment of the present invention.
Figure 24:
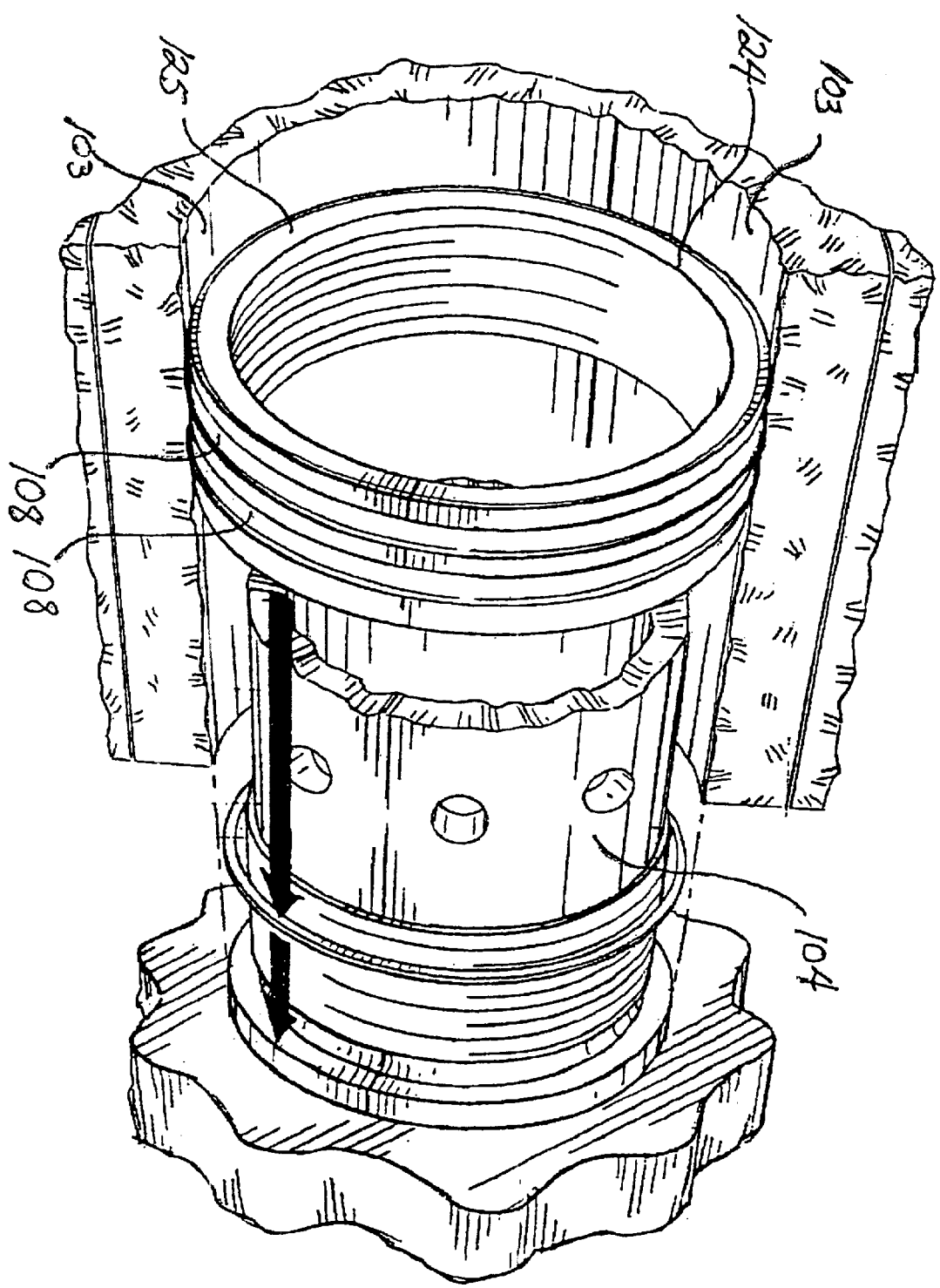

The high-current conductor 64 preferably is formed of copper (Cu) because of the conductive capacity of copper. It is to be understood, however, that the present invention may be effectively employed with other types of conductors as will be readily apparent to those skilled in the art. As would be anticipated, the current carried by the high-current conductor 64 and the other components within the generator readily generates heat within the power generator 72 and housing 70 thereby increasing the temperature of the conductor 64, the other generator components, and the surrounding regions. One means of cooling the system is to disperse a cooling fluid within the housing 70 directed to flow over various components of the power generator 72 via fluid channels. FIGS. 4, 5, and 8, illustrate a fluid channel 62 that extends adjacent at least a portion of the outer surface 65 of the high-current conductor 64. The fluid channel 62 is defined by a surface portion 63 of a structure spaced apart from the high-current conductor 64 and the outer surface of the high-current conductor 65.

Thus, the fluid channel 62 is bounded by a portion of the outer surface 65 of the high-current conductor 64 and the surface 63 of the spaced-apart structure. Conventionally, cooling fluid is pumped or blown into a conductor bore or channel 80 extending within the high-current conductor 64. The cooling fluid flows out of the conductor channel 80 via vent holes 82 formed in the channel-containing high-current conductor 64 and fills the fluid channel 62 adjacent the high-current conductor 64. One end of the fluid channel 62 can be open to provide means of fluid egress. The other end of the fluid channel 62, which coincides substantially with the end of the conductor 64, however, should be sealed to prevent the escape of the cooling fluid.

The cooling effect of the cooling fluid on the high-current conductor 64 is enhanced according to the degree to which the fluid channel 62 permits cooling fluid to flow over the surface of the high-current conductor 64. A distinct advantage of the present invention is that it permits a fluid channel to be sealed at the end portion of the high-current conductor 64 to thereby permit the fluid channel to extend substantially over the area comprising the surface of the high-current conductor 64. Positioned at the end of the high-current conductor 64, the seal according to the present invention, permits the cooling fluid to reach nearly the entire extent of the inner and outer surfaces of the high-current conductor 64. This contrasts sharply with other sealing devices and methods such as the fixed wedge and O-ring, which must be fixed to the conductor 64 substantially away from the end portion of the conductor (See, e.g., FIG. 1).

The fluid channel 62 may be of virtually any dimension, but preferably, is formed by a sleeve 66 that substantially surrounds the high-current conductor 64. The cooling fluid is pumped or blown into the conductor channel 80 extending within the high-current conductor 64, as described above, and flows out of the current channel via vent holes 82 formed in the high-current conductor 64 thereby filling the fluid channel defined by the sleeve 66 surrounding the high-current conductor. An effective cooling fluid is hydrogen gas ($H_2$). Just as the high-current conductor 64 may be formed of any conductive material, however, so too, the cooling fluid can be a fluid other than hydrogen gas. Likewise, the surface 63 spaced apart from the surface 65 of the high-current conductor 64 and bounding the fluid channel 62 can be formed of various materials. Preferably, however, the surface 63 is an insulating surface that is formed from an insulating material. Preferably the insulating material is fiberglass.

According to the present invention, a protected seal 88 is positioned to connect to an end portion of the high-current conductor 64 and positioned adjacent the sleeve 66 to prevent leakage of fluid from the fluid channel 62. The protected seal 88, more specifically, preferably includes a seal body 84 positioned within the fluid channel between the high-current conductor 64 and the sleeve 66 to thereby define an end boundary of the fluid channel 62. The seal body 84, moreover, has a first surface portion 85 connected to a portion of the outer surface 65 of the high-current conductor 64 and a second surface portion 61 extending adjacent an inner surface portion-63 of the sleeve 66 so as to permit the sliding seal 88 to readily slide or otherwise move relative to the sleeve 66.

Sliding and other movements can stem from several distinct sources. For example, thermal expansion, which has been empirically estimated to account for as much as ninety percent (90%) of the sliding movement, causes an axial expansion of the high-current conductor on which the seal 88 is positioned. Specifically, given that the high-current conductor 64 is preferably formed of a current-conveying metal while the sleeve 66 is preferably formed of an insulating material like that of fiberglass, the coefficient of thermal expansion for the conductor 64 is likely to be greater than that of the sleeve 66. This leads to unequal radial and axial expansions, with that of the conductor 64 being noticeably more pronounced than that of the sleeve 66. As a result, the conductor 66 and, as a consequence, the seal body 84 attached to it moves relative to the sleeve 66.

Another source of movement of the seal 88 relative to the sleeve 66 is the inevitable vibratory motions that arise during operation of the generator and which can cause the seal 88 to move radially as well as axially relative to the sleeve 66. So too, though likely to a lesser extent, fluid pressure can disproportionately affect the seal 88 and the sleeve 66 thereby contributing to the movement of the seal 88 relative to the sleeve 66.

The protected seal 88, according to the present invention, accommodates various movements by allowing the seal 88 to move relative to the sleeve 66 in response to these disparate forces without degrading the seal 88 or lessening its sealing effectiveness. Firstly, an abrasion abatement layer 89 is disposed on a portion of the second surface 61 of the seal body 84. The abrasion abatement layer 89 is preferably formed of a "soft" metal. A "soft" metal, as used herein, is one that interacts with the surface 63 of the sleeve 66 by partially disposing within the interstices between any abrading particles extending from the surface 63 of the sleeve 66 (e.g., glass shards), thereby smoothing the surface 63 rather than being abraded by the particles extruding therefrom. Silver is such a "soft" metal having the desired property, and it preferably is used to form the silver plated layer on the seal body 84 formed of copper.

The abrasion abatement layer 89 formed by the silver platting and having the properties so described contacts the surface 63 of the fiberglass sleeve 66 and at least-partially disposes between the minute glass shards extending therefrom. Thus, rather than the sleeve surface 63 abrading the surface 61 of the seal body 84, the abrasion abatement layer 89 smooths the surface 63 of the sleeve 66 by at least partially enveloping the abrading particles extending from the surface 63 of the sleeve 66.

The seal body 84 is not in rigid or fixed contact with the surface 63 of the sleeve 66 and is able to readily slide or otherwise move relative to the sleeve 66 in response to the forces described above. When the second surface 61 of the seal body 84 having disposed thereon the abrasions abatement layer 88 slidably or otherwise movingly contacts the sleeve 66, it is the abrasion abatement layer 89, specifically, that directly contacts the inner surface 63 of the sleeve 66. The abrasion abatement layer 89 thus substantially reduces or prevents abrading degradation of the protected seal 88 as it slidably or otherwise movingly contacts the surface 63 of the sleeve 66.

In addition, at least one sealing gasket 68 is positioned on the seal body 84 to contact the inner surface 63 of the sleeve 66. The at least one sealing gasket 68 preferably is formed of a compressible and pliable material (e.g., natural rubber or any of the various elastomeric polymers having the properties of rubber). The at least one sealing gasket 68 is positioned to expand as the sleeve 66 moves away from the seal body 84 and compress as the sleeve 66 moves closer to the seal body 84. Thus, the at least one-sealing gasket 68 responds to movement of the seal 88 relative to sleeve 66 by closing potential gaps between the corresponding portion of the second surface 61 of the seal body 84 and the inner surface 63 of the sleeve 66 to thereby prevent leakage of fluid when the protected seal 88 slidably or otherwise moves relative to the sleeve 66. Likewise, the sealing gasket 68 compresses when the seal body 84 moves toward the inner surface 63 of the sleeve 66 and thus movingly contacts the surface 63 of the sleeve 66, the compression being sufficient to avoid interfering with the relative movement of the seal 88 relative to the sleeve 66 while continuing to prevent leakage of fluid when the seal 88 moves relative to the sleeve 66.

The seal body 84 preferably is formed of a material having a thermal expansion coefficient that is the same or substantially similar (i.e., within a preselected range) to the thermal expansion coefficient of the conductor. Ensuring that the conductor 64 and the seal body 84 have equal or numerically close coefficients of thermal expansion provides an independent, distinct advantage: thermal expansion affects both the conductor 64 and the seal body 84 equally or substantially similarly. As a result of thermal expansion, both-the seal body 84 as well as the conductor 64 to which the seal body 84 is attached slide relative to the sleeve 66 but not to each other.

Figure 6:
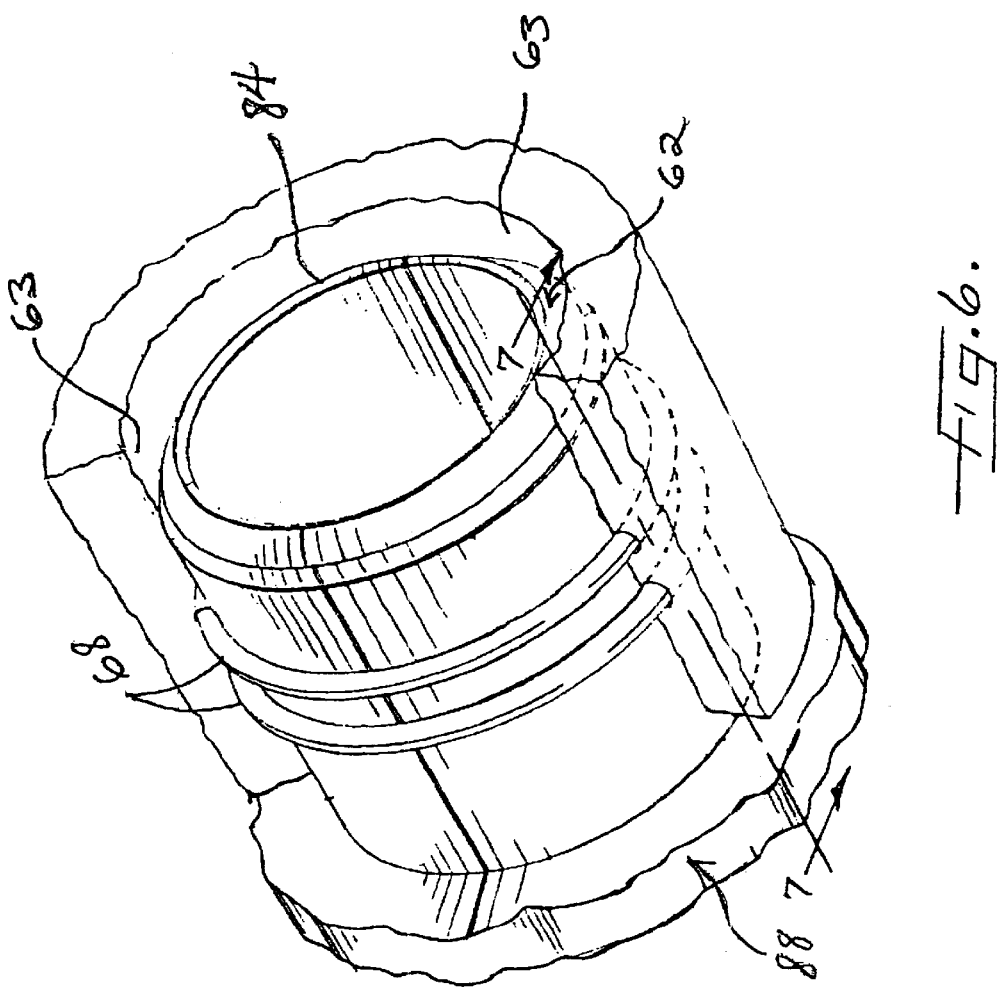
FIG. 6 is a fragmentary perspective view of an insulating sleeve surrounding a sliding seal and having portions broken away to provide a view of the seal having positioned on the body of the seal two sealing gaskets positioned to fit within sealing gasket glands formed in an inner surface of the sleeve according to a first embodiment of the present invention.
Figure 7:
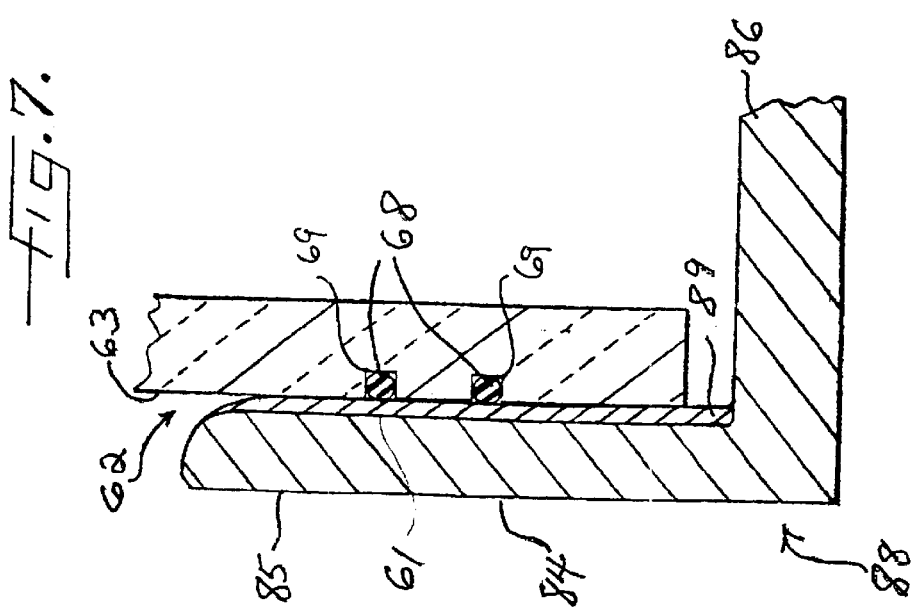
FIG. 7 is a sectional view of a fluid channel forming member and sliding seal taken along line 7—7 of FIG. 6, the sliding seal having an abrasion abatement layer and two sealing gaskets positioned in sealing gasket glands formed in a surface of the fluid channel forming member according to a first embodiment of the present invention.

In a first embodiment of the apparatus according to the present invention, the sealing gasket 68 of the protected seal 60 is insulated from seal-degrading electrical current by forming the sleeve 66 of an insulating material (e.g., fiberglass) and having at least one sealing gasket gland 69 formed in a portion of the inner surface 63 of the sleeve 66 within which the sealing gasket 68 is positioned (See FIGS. 5 and 7). More specifically, as illustrated in FIG. 6 the at least one sealing gasket 68 positioned on the second surface 61 of the seal body 84 is preferably provided by an O-ring that can be advantageously insulated from current-induced effects that would otherwise cause degradation of the O-ring by positioning the O-ring within an O-ring gland defining the sealing gasket gland 69.

Conventional sealing devices have positioned the O-ring within an O-ring gland formed in a wedge 20 (see, e.g., FIG. 1). The O-ring contacts a surface of the fluid channel to enhance the sealing effect of the wedge 20. Nonetheless, because the wedge 20 typically is formed of the same or a similarly conductive metallic material as the conductor 24, the O-ring will be degraded by current flowing along the surface of the gland in which the O-ring is positioned. More specifically, and as will be readily understood by those skilled in the art, electrical current flowing along the surface in which the O-ring gland is formed contributes to increasing the temperature in and around the O-ring gland and accordingly the temperature of the O-ring contained in the O-ring gland. The elevation in temperature contributes to the degradation of the O-ring. Moreover, the current flow also causes electrical losses approximately computed by the well-known formula P=VI, where P represents power (i.e., the electrical loss) and V is a measure of voltage associated with the current I.

These electrical losses and gasket degrading effects of current-induced temperature elevation are effectively overcome by the present invention. Specifically, by positioning the at least one sealing gasket 68 within a sealing gasket gland 69 formed in the surface 63 of the sleeve 66 which is itself formed of an insulating material such as fiberglass, the sealing gasket gland 69 and hence the sealing gasket are substantially insulated. The potential for a conductive path in the surface of the sealing gasket glands 69 or the surface 63 in which they are formed is negated by the insulting material of the sleeve 66 in which the sealing gasket gland 69 is formed. Thus, the sealing gasket gland 69 and, accordingly, the sealing gasket 68 positioned in the space therein are substantially insulated from electrical current thereby reducing electrical losses and temperature effects that would otherwise contribute to the degradation of the at least one sealing gasket 68.

Preferably, the apparatus also includes a flange 86 extending outwardly from an end of the seal body 84 in a substantially radial direction relative to the seal body 84. The flange 86 is connected to the seal body 84 to provide a conductive path from the high-current conductor 64 to the current bus assembly positioned apart from the housing 70 containing the power generator 72. As illustrated in FIG. 3, the bus assembly typically comprises a bus adapter 92 to which the conductor 64 is connected and which connects to a plurality of flexible conductors 94 which convey the current to a plant bus.

Moreover, although it need not be in order to achieve the other described advantages of the sliding seal 88, the flange 84 preferably is integrally formed with the seal body 84. Significant advantages are achieved with the integrally formed sliding seal 88, including enhanced structural integrity and electrical conductivity properties. Moreover, the seal 88 is much more efficiently manufactured and installed within the power generation system as compared to conventional devices such as the wedge-ring which must be manufactured as multiple pieces and installed through a series of costly and time consuming steps.

As perhaps best illustrated in FIG. 6, the seal body 84 is formed to have a substantially annular shape. The first surface portion 85 of the seal body 84 defining the inner surface that directly contacts the surface 65 of the high-current conductor 64, moreover, can be threaded so as to thread onto a correspondingly threaded end portion of the conductor 64. Preferably, the threads are sealed using a commercially available adhesive such as LOCTITE manufactured by a company having the same name, the company being a subsidiary of the Henkel Group and having its United States operations headquartered in Rocky Hill, Conn. To enhance the threaded connection between the seal 88 and the surface 65 of the conductor 64, moreover, the threads preferably are staked as will be readily understood by those skilled in the art.

In a second embodiment of the apparatus 100, at least one sealing gasket 108 is positioned within at least one sealing gasket gland 109 formed in the second surface 101 of the seal body 124. Forming a sealing gasket gland 109 in the seal body 124 poses the problems of gasket-degrading temperature elevations and electrical losses as described above in greater detail. To overcome these problems, therefore, the second embodiment of the apparatus further includes an insulating gasket 130.

FIGS. 9 through 14 illustrate the second embodiment of the apparatus 100. According to this second embodiment and as perhaps best illustrated in FIG. 11, the sliding seal 128 includes at least one sealing gasket gland 109 formed in the second surface 101 of the seal body 124. At least one sealing gasket 108 is at least partially positioned within the at least one sealing gasket gland 109 and contacts the inner surface portion 103 of a sleeve or other fluid channel forming member so as to expand and contract in response to movement of the seal 128 relative to the fluid channel forming member to thereby prevent the opening of gaps between the second surface portion 101 of the seal body 124 and the inner surface portion 103 of the sleeve or other fluid channel forming member. The sealing gasket 108, moreover, compresses when the inner surface portion 103 moves closer to the seal body 124 to thus inhibit leakage of fluid when the sliding seal 128 moves relative to the sleeve or other fluid channel forming member. The sliding seal according to this second embodiment, moreover, includes a flange 126 spaced apart from the seal body 124. The flange 126 contacts the high-current conductor 104 to provide a conductive path from the high-current conductor 104 to a bus assembly.

FIG. 13 illustrates an insulating gasket 130 that preferably forms part of the seal 128 according to this second embodiment of the present invention. The insulating gasket 130 is included in order to inhibit electrical losses and current-induced temperature effects in and around the at least one sealing gasket gland 109. The insulating gasket 130 preferably is positioned between the seal body 124 and spaced-apart flange 126 to inhibit electrical current along the second surface 101 portion of the seal body 124. Interposed between the seal body 124 and the spaced-apart flange 126, the insulating gasket 130 substantially inhibits current flow along the second surface 101 of the seal body 124 in which the at least one sealing gasket gland 109 is formed. Specifically, because an end portion of the seal body 124 is in contact with the insulating gasket 130, the first surface 125 of the seal body 124, which is in direct conductive contact with the high-current conductor 104, offers the path of lowest electrical resistance, which the path along the second surface 101 of the seal body 124 which is substantially insulated by the insulating gasket 130 interposed between the seal body 124 and the spaced-apart flange 126.

Therefore, the at least one sealing gasket gland 109 and the at least one sealing gasket 108 positioned therein are substantially insulated from current that otherwise would degrade the at least one sealing gasket 108 and cause electrical losses. Thus, by inhibiting current in the second surface 101 of the sealing body 124, the insulating gasket 130 interposed between the seal body 124 and the spaced-apart flange 126 substantially reduces or eliminates altogether electrical loss and degradation to the sealing gaskets.

The sliding seal 88, 128 according to the present invention has already been described in the context of a power generator having a rotor and stator. As already described, the power generator includes a high-current conductor 64, 104 and a sleeve or other fluid channel structure substantially surrounding the high-current conductor to thereby define a fluid channel forming member adjacent the conductor 104. More generally, however, the present invention provides a protected seal 88, 128 adapted to be positioned adjacent any conductor 64, 104 and any insulating surface spaced apart from the conductor, the spaced apart insulating surface defining a boundary of a fluid channel 62, 102 bounded by a portion of the outer surface of the conductor 64, 104 and a surface of a fluid channel forming member. The sliding seal 88, 128 is positioned to prevent fluid leakage from the fluid channel 62, 102 when contacting a portion of the insulating surface. The protected seal 88, 128 moreover is substantially protected from surface abrasions and seal-degrading current flows.

The seal 88, 128 preferably includes a seal body 64, 124 having a first surface 85, 125 adapted to be threaded onto or otherwise connected to a surface portion of the high-current conductor 64, 104. The seal body 64, 124, moreover has a second surface 61, 101 extending adjacent a surface 63, 103 (an insulating surface) of the channel forming member to thereby permit the seal 88, 128 to readily slide or otherwise move relative to the surface 63, 107. In addition, an abrasion abatement layer 89, 129 is disposed on a portion of the second surface 61, 101 of the seal body 84, 124 to prevent seal degrading abrasions of the sliding seal 88, 128 as the seal readily slides or otherwise moves relative to the surface 63, 103 and the abrasion abatement layer 89, 128 contacts the insulating surface 63, 107. The abrasion abatement layer 89, 129 preferably is formed of a soft metal layer disposed on the second surface 61, 101 portion of the seal body 84, 124 to thereby enhance the ability of the seal 88, 128 to readily slide or otherwise move relative to the insulating surface 63, 103 of the fluid channel forming member without sustaining seal degrading abrasions. Preferably, the sliding seal 88, 128 is adapted to be positioned on an end portion of the conductor 64, 104.

Preferably, moreover, at least one sealing gasket 68 is positioned and adapted to fit within an sealing gasket gland 69 formed in the surface of the fluid channel forming member. Alternatively, the at least one sealing gasket gland 109 is positioned within the seal body 84 of the seal, and an insulating gasket 130 is positioned to inhibit seal degrading current flow in and around the sealing gasket gland 109.

The present invention, moreover, provides various methods for preventing leakage of fluid in a fluid-cooled generator. According to one method aspect of the present invention, the method comprises positioning a seal 88, 128 to slidably or otherwise movingly contact an inner surface 63, 103 of a fluid channel, where the fluid channel is positioned adjacent a conductor 64, 104 so as to permit the seal 88, 128 to slidably or otherwise move relative to the fluid channel in response to various effects. These effects include thermal expansion effects of the conductor, vibratory movements of the fluid channel relative to the conductor, and pressure exerted by fluid within the fluid channel. The method further comprises inhibiting or reducing electrical current flow in and around portions of the seal 88, 128 to thereby prevent degradation of the seal 88, 128.

The method further includes expanding a portion of the seal 88, 128 that contacts the inner surface the fluid channel to prevent the opening of gaps between the seal and the inner surface 63, 103 of the fluid channel whenever the fluid channel moves away from the conductor 64, 104. The step is intended to thereby prevent leakage of fluid when the seal 88, 128 slidably or otherwise moves relative to the fluid channel in response to thermal expansion effects of the high-current conductor, vibratory movements of the fluid channel relative to the high-current conductor, and pressure exerted by fluid within the fluid channel. The method also includes contracting the portion of the seal 88, 128 contacting the inner surface 63, 103 the fluid channel in response to the fluid channel moving closer to the conductor.

A further method aspect of the present invention encompasses a method for reducing current-induced degradations in a seal 88 positioned to prevent leakage of fluid from a fluid channel positioned adjacent a conductor in a fluid-cooled generator. The method, more specifically, includes providing at least one sealing gasket 68 adapted to be positioned on the seal 88 and to fit within a sealing gasket gland 69 formed in the surface of the fluid channel.

Yet a further method aspect of the present invention is a separate and distinct method for reducing current-induced degradations in a seal 128 positioned to prevent leakage of fluid from a fluid channel positioned adjacent a conductor 104 in a fluid-cooled power generator. This method comprises providing at least one sealing gasket 108 adapted to be positioned within a sealing gasket gland 109 formed in a body portion of the seal 128, and providing an insulating gasket 130 positioned to inhibit current flow along the surface of the sealing gasket gland 109.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That claimed is:

1. An apparatus to prevent leakage of fluid in a fluid-cooled power generator, the apparatus comprising:
   a housing;
   a current bus assembly positioned outside the housing;
   a power generator having a rotor and stator contained within the housing and electrically connected to the current bus assembly;
   a high-current conductor electrically connected to and extending from the stator of the power generator;
   a sleeve positioned to substantially surround the high-current conductor and spaced apart therefrom to thereby define a fluid channel bounded by a portion of the outer surface of the high-current conductor and a portion of the inner surface of the sleeve; and
   a protected seal connected to an end portion of the high-current conductor and positioned adjacent the sleeve to prevent leakage of fluid from the fluid channel, the protected seal comprising:
   a seal body positioned within the fluid channel between the high-current conductor and the sleeve to thereby define an end boundary of the fluid channel, the seal body having a first surface portion connected to an outer surface portion of the high-current conductor and a second surface portion extending adjacent an inner surface portion of the sleeve to permit the protected seal to readily move relative to the sleeve,
   an abrasion abatement layer disposed on a portion of the second surface of the seal body to permit the protected seal to readily move relative to the sleeve without abrading the surface of the seal body when the seal body contacts the inner surface portion of the sleeve, and at least one sealing gasket positioned on the second surface portion of the seal body to contact the inner surface portion of the sleeve, the at least one sealing gasket formed of a compressible and pliable material so that the at least one sealing gasket expands to prevent the opening of gaps between the seal and the inner surface portion of the sleeve when the seal moves away from the sleeve and contracts when the seal moves toward the sleeve to thereby prevent leakage of fluid when the protected seal moves relative to the sleeve.

2. An apparatus as defined in claim 1, wherein the abrasion abatement layer comprises a soft metallic layer formed on the second surface portion of the seal body to thereby permit the protected seal to readily move relative to the sleeve without abrading the surface of the seal body when the seal body contacts the inner surface portion of the sleeve.

3. An apparatus as defined in claim 1, wherein the seal body of the protected seal is formed of a material having a thermal expansion coefficient substantially equal to that of the material from which the high-current conductor is formed such that the effects of thermally induced axial expansion in both the protected seal and the high-current conductor are substantially identical.

4. An apparatus as defined in claim 3, wherein the sleeve is formed of an insulating material and has at least one sealing gasket gland formed in the inner surface thereof such that the sealing gasket positioned therein is substantially insulated from seal-degrading electrical current.

5. An apparatus as defined in claim 4, wherein the sliding seal further comprises a flange extending outwardly from an end of the seal body in a substantially radial direction relative to the seal body and connected to the seal body to provide a conductive path from the high-current conductor to the current bus assembly.

6. An apparatus as defined in claim 3, wherein the protected seal further comprises at least one sealing gasket gland formed in the second surface of the seal body, and wherein the at least one sealing gasket is positioned in the at least one sealing gasket gland.

7. An apparatus as defined in claim 6, wherein the protected seal further comprises a flange spaced apart from the seal body and contacting the high-current conductor to provide a conductive path from the high-current conductor to the current bus assembly.

8. An apparatus as defined in claim 7, further comprising an insulating gasket positioned between the seal body and the spaced-apart flange to inhibit electrical current along the second surface portion of the seal body such that the sealing gasket gland and sealing gasket positioned therein are substantially insulated from seal-degrading electrical current.

* * * * *